W. N. Oakes,
Gage Lathe.

№ 20,505.                                   Patented June 8, 1858.

UNITED STATES PATENT OFFICE.

W. N. OAKES, OF DANA, MASSACHUSETTS.

MACHINE FOR CUTTING IRREGULAR FORMS.

Specification of Letters Patent No. 20,505, dated June 8, 1858.

*To all whom it may concern:*

Be it known that I, WILLIAM N. OAKES, of Dana, in the county of Worcester and State of Massachusetts, have invented a new and useful Improvement in Machines for Cutting or Planing Irregular Forms, the construction and operation of which I have described in the following specification and illustrated in the accompanying drawings with sufficient clearness to enable competent and skilful workmen in the arts to which it pertains or is most nearly allied to make and use my invention.

My said invention consists in the combination of two carriages running at different speeds as hereinafter described, with a spread pattern and the necessary tracer and cutters, as hereinafter more fully set forth.

Figure 1:
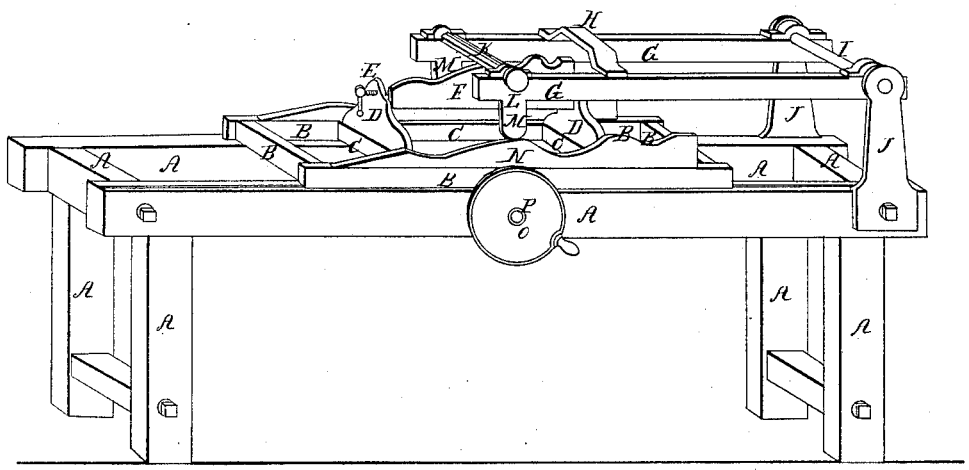
Figure 2:
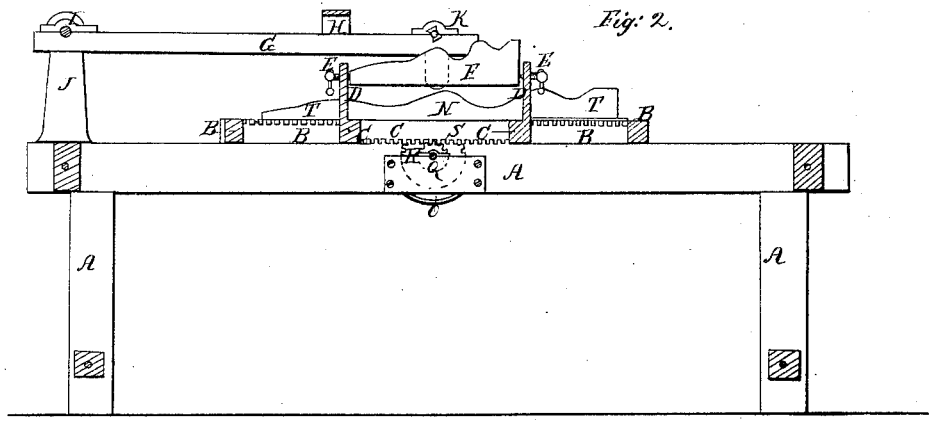

In the accompanying drawings Figure 1 is a perspective view of my improved machine. Fig. 2 is a longitudinal vertical section of it.

In cutting irregular forms in which sharp curves, and abrupt elevations and depressions abound it is found very difficult to make the tracer follow the pattern, as exceedingly sharp ascents have a tendency to press the tracer sidewise, but on account of their abruptness have little or none to raise it. This difficulty is very seriously felt in the manufacture of piano forte legs and other articles of a like nature, in which the cutter must rise very abruptly to produce the form required. My invention obviates this difficulty by employing two carriages both of which have a rectilinear motion, but which are so connected by gearing as to run at different speeds the one having the pattern upon it having the most rapid motion, and the pattern being elongated so as to reduce the abruptness of the ascent as shown in the drawings and further described.

A is the frame of the machine, of suitable form and dimensions to support the working parts.

B is a carriage or frame which supports the pattern N; and rests upon guides upon the frame A. C is another carriage which also slides upon the frame A in the same direction at the same time, but not so rapidly as the carriage B. This carriage C carries the work to be cut which is marked F, by supporting it between the uprights D D which are attached to the carriage C. The work F is held in position by two screw dogs E E. The rotary cutter head K to which the cutters are attached which reduce the work to form is hung in suitable bearings in the arms G G which form part of the vibrating frame for its support. These arms G G are connected by the bar H, and are supported at the end opposite the cutter head K by the shaft I upon which they are allowed to vibrate, said shaft I being supported by the uprights J attached to the frame A. M are the tracers which rest upon the patterns to guide the cutters.

Racks are attached to each of the carriages B and C as shown in the drawings to gear upon the wheel R and the pinion Q on the shaft P. The wheel R gears into the rack T on the carriage B, and the pinion Q gears into the rack S to give motion to the carriage C which carries the work. Rotary motion being given to the shaft P will give motion to both the carriages B and C and in the same direction, but at altogether different speeds; the carriage B which carries the pattern running much faster than the carriage C.

It is obvious that by this arrangement of parts the inclines up which the tracers must pass may be made much more easy in their ascent than they could be were the carriages propelled at equal speeds; and consequently that much sharper inclines and curves may be cut by this machine than if the speed of the two carriages and the contour of the pattern and work were the same. The particular improvement which constitutes my said invention, and which I claim as having been originally and first invented by me, is the combination of the two carriages B and C having a rectilinear motion at different speeds, with the elongated pattern, tracers and cutter for the purposes set forth; not intending to claim an elongated pattern as such; or combined with other machinery to cut irregular forms; but only its combination with two carriages having a rectilinear motion at different speeds in the manner described.

WM. N. OAKES.

Witnesses:
DANIEL STONE,
ALBERT BOSWORTH.